C. C. CARTER.
Grain Drill.

No. 57,862. Patented September 11, 1866.

Witnesses;

Inventor
Cyrus C. Carter
Per Munn & Co.
Attorneys

UNITED STATES PATENT OFFICE.

CYRUS C. CARTER, OF EXETER, ILLINOIS.

IMPROVEMENT IN MACHINES FOR SOWING WHEAT AND OTHER GRAIN.

Specification forming part of Letters Patent No. 57,862, dated September 11, 1866.

*To all whom it may concern:*

Be it known that I, CYRUS C. CARTER, of Exeter, in the county of Scott and State of Illinois, have invented a new and Improved Machine for Sowing Wheat and other Grain; and I do hereby declare that the following is a full, clear, and exact description thereof, which will enable those skilled in the art to make and use the same, reference being had to the accompanying drawings, forming part of this specification, in which—

Figure 1:
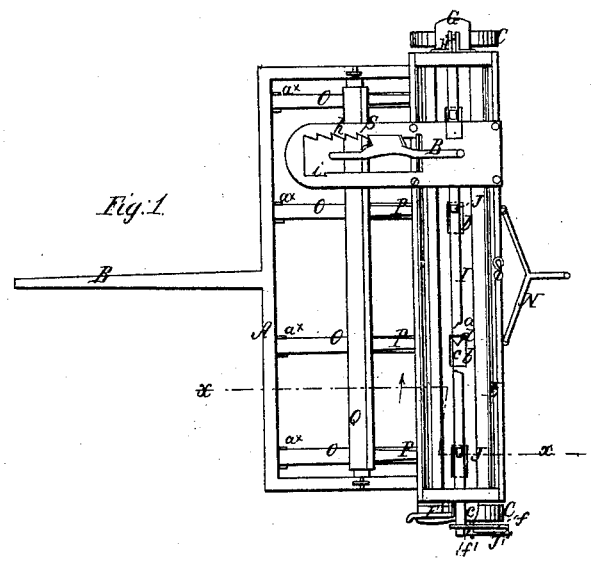
Figure 2:
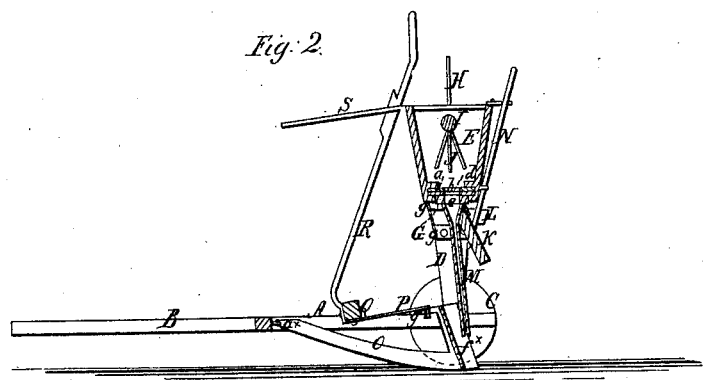
Figure 3:
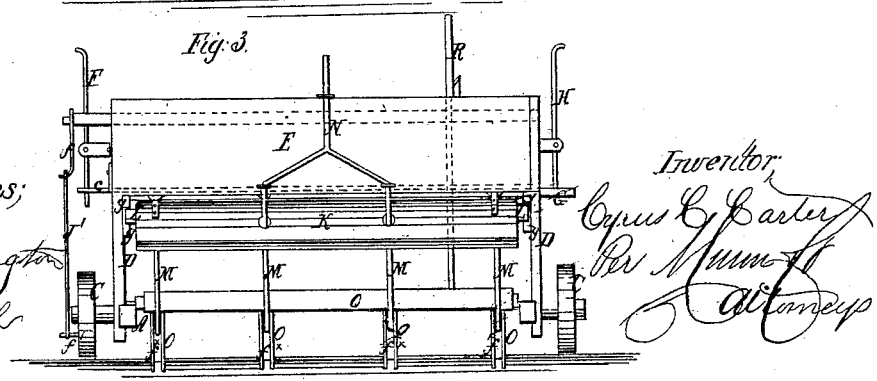

Figure 1 is a plan or top view of my invention; Fig. 2, a transverse vertical section of my invention, taken in the line $x\ x$, Fig. 1; Fig. 3, a rear view of the same.

Similar letters of reference indicate corresponding parts.

This invention relates to a new and improved device for sowing wheat and other grain, either in drills or broadcast.

The invention consists in a novel arrangement of runners or furrow-openers and seed-conveying tubes, as hereinafter fully shown and described, whereby the desired work may be perfectly performed by a very simple arrangement of parts.

A represents a frame composed of three sides of a quadrangle, and having a draft-pole, B, attached, the rear part of said frame being supported by wheels C C.

To each side of this frame A there is attached an upright, D, said uprights being in line with the axes of the wheels C C; and E is a seed-box, which is secured between the upper parts of the uprights D D.

The seed-box E is provided with a bottom, $a$, which may be of sheet metal, and has rectangular openings $b$ made in it at a suitable distance apart; and underneath the bottom $a$ there is a slide, $c$, having triangular or V-shaped holes $d$ made in it. (Shown in Fig. 1.) This slide $c$ is operated by a lever, F, at the left-hand side of the seed-box, so that the capacity of the holes or openings $b\ d$ may be varied according to the quantity of seed to be sown on a given area.

Underneath the slide $c$ there is another slide, G, provided with rectangular holes $e$, and adjusted by a lever, H, at the right-hand side of the seed-box. This slide G is for the purpose of cutting off the discharge of seed from the seed-box E when desired.

I is a shaft, which is placed in the upper part of the seed-box E, and has a longitudinal position therein. This shaft I is provided with a series of pendants, J, which work over the holes in the bottom of the seed-box and the slides underneath it, a rocking or oscillating motion being given the shaft I by means of a rod, J', connected to arms $f\ f'$, attached, respectively, to the shaft I and to one of the wheels C, the arm $f'$ being attached to the wheel C at some distance from its center, as shown clearly in Fig. 3.

The pendants J serve as agitators, and insure the free discharge of the seed from the seed-box.

K represents an inclined board, the ends of which are attached to slides L L, fitted between horizontal guides $g$ at the inner surfaces of the uprights D D. The upper edge of this inclined board K just clears the under surface of the slide G, and it has a series of seed-conveying tubes, M, attached to its inner and uppermost edge, said tubes being in line with the holes $e$ in the slide G. A forked lever, N, is connected with this inclined board, and by adjusting said lever the upper ends of the tubes M may be brought directly under the holes $e$, so as to receive the seed discharged therefrom; or said tubes may be shoved ahead or in front of said holes $e$, so that the seed will be discharged upon the board K. This latter adjustment of the inclined board K is used when the grain is to be sowed broadcast, and the former adjustment of said board used when the grain is to be sowed in drills.

O represents a series of runners or furrow-openers, which are slightly curved in a longitudinal direction, and attached by joints $a^\times$ to the front end of frame A, as indicated in Fig. 2, and have their rear parts extending upward, with a groove, $f^\times$, made in them to receive the lower parts of the tubes M.

P represents a series of springs, the front ends of which are attached to a shaft, Q, fitted in the front part of the frame A. The rear ends of these springs are bent in hook form, and extend around pins $g$ in the front part of the rear portions of the runners, as shown in Fig. 2.

The shaft Q has a lever, R, attached to it, said lever extending up in front of the seed-box E, and passing through a slot in a plate, S, projecting from the upper part of the seed-box, the slot being serrated at one side, as shown at $h$, to hold the lever R at different points, and having a notch, $i$, made in its opposite side to hold the lever in a forward position. (See Fig. 1.)

By drawing backward the upper end of the lever R, the springs P are made to press down the runners O, and the runners may be made to penetrate the earth at a greater or less depth, according to the depth it is required to plant the seed, by adjusting the lever R a greater or less distance backward; and these springs also serve to make the runners enter hollows or cavities in the surface of the ground, and insure all the seed being covered where planted or sowed on uneven ground.

Having thus described my invention, I claim as new and desire to secure by Letters Patent—

1. The shaft Q, with the lever R attached, in combination with the springs P and runners or furrow-openers O, all arranged to operate substantially as and for the purpose set forth.

2. The sliding or adjustable inclined board K, with the seed-conveying tubes M attached, and arranged in relation with the seed-box E, substantially as and for the purpose specified.

3. The pendants or agitators J, attached to the rock-shaft I, operated from one of the wheels C, as shown, in combination with the perforated bottom $a$ of the seed-box E and the perforated slides $c$ G, substantially as and for the purpose set forth.

CYRUS C. CARTER.

Witnesses:
R. BURBANK,
WILLIAM H. DAWSON.